United States Patent

[11] 3,565,078

[72] Inventors Vincent L. Vailliancourt
Livingston;
Thomas Thackston, Florham Park; John E. McGaughey, East Brunswick, N.J.
[21] Appl. No. 819,201
[22] Filed Apr. 25, 1969
[45] Patented Feb. 23, 1971
[73] Assignee C. R. Bard, Inc.
Murray Hill, N.J.

[54] QUICK DISCONNECT CATHETER COUPLING
5 Claims, 6 Drawing Figs.
[52] U.S. Cl. .................................................. 128/349;
137/223; 137/320; 251/149.1; 285/176; 285/260
[51] Int. Cl. ............................................................. A61m 25/00
[50] Field of Search.......................................... 128/348-
—351; 285/176, 260; 251/149.1; 137/223, 320

[56] References Cited
UNITED STATES PATENTS
| | | | |
|---|---|---|---|
| 3,112,748 | 12/1963 | Colburn ....................... | 128/350 |
| 3,174,501 | 3/1965 | De See et al. ................ | 137/223 |
| 3,385,301 | 5/1968 | Harautuneian ............... | 128/349 |
| 3,388,705 | 6/1968 | Grosshandler ............... | 128/351 |
| 3,416,567 | 12/1968 | Von Dardel et al. .......... | 128/214X |
| 3,421,509 | 1/1969 | Fiore ............................ | 128/349 |

Primary Examiner—Dalton L. Truluck
Attorney—W. Saxton Seward

ABSTRACT: An assembly of elements installed in the funnel of a catheter including a piece of rubber tubing having a diameter large enough to bear against the inner wall of the funnel in combination with a relatively stiff plastic valve liner of approximately conical form when closed, split longitudinally from its apex to points near its base, the valve liner resting in the funnel entrance beside an outer flattened end of the rubber tubing, the inner end portion of the tubing bearing against the funnel wall and closing the funnel; the plastic valve liner being adapted to receive the tapered end of connector or adapter which separates the split portions of the valve and pushes aside the funnel-closing portion of the tubing.

PATENTED FEB 23 1971 3,565,078
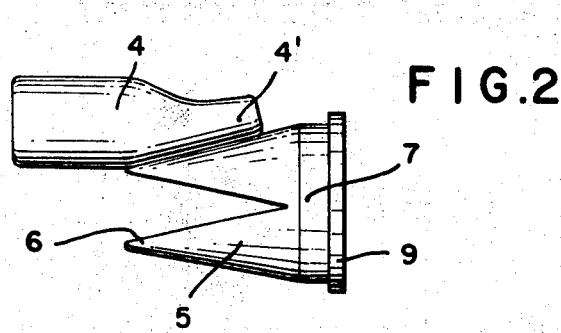
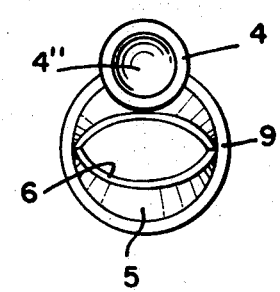
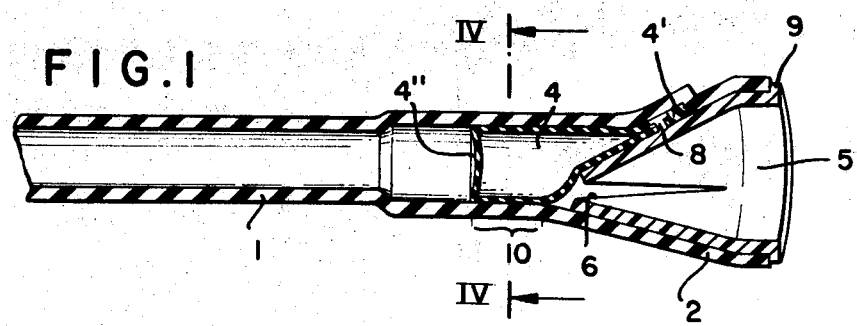
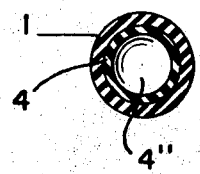
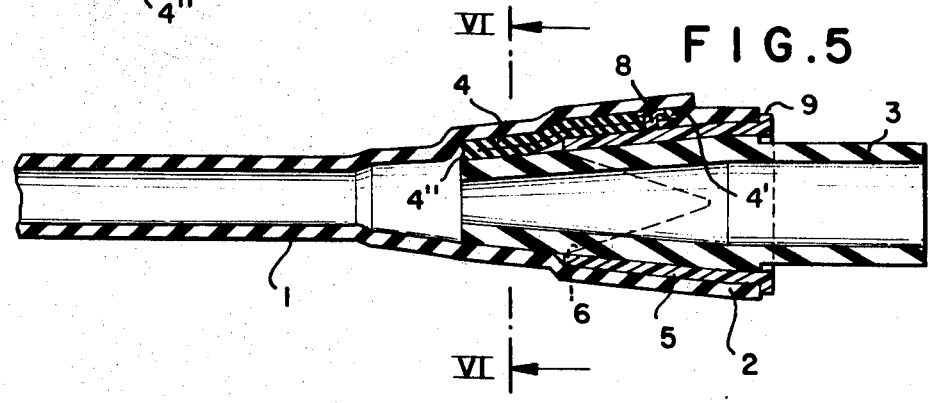
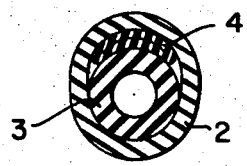
THOMAS THACKSTON
VINCENT L. VAILLANCOURT
JOHN Mc GAUGHEY
   INVENTORS.
BY *Nolte and Nolte*
ATTORNEYS

QUICK DISCONNECT CATHETER COUPLING

It is customary to attach the funnels of catheters, particularly those used for urological purposes, to drainage or irrigation tubes by means of connectors or adapters having a tapered end fitting snugly within the funnel, the strength of the engagement depending largely on how firmly the respective parts are pushed together. If the fit is too loose the parts may become accidentally detached, while a very tight fit may cause inconvenience when detachment is desired and attempted. In the latter situation it is frequently important to close off the catheter, which requires the use of a clamp or the like.

An object of the present invention is to provide a valved coupling assembly which readily attaches to and detaches from a connector or adapter, with automatic opening and closing of the catheter funnel.

A practical embodiment of the invention is shown in the accompanying drawing, in which:

FIG. 1 represents an axial section through the funnel end of a catheter and through the coupling installed therein;

FIG. 2 represents a side elevation of the tubing and plastic valve subassembly;

FIG. 3 represents an end view of the subassembly from the left of FIG. 2;

FIG. 4 represents a section on the line IV–IV of FIG. 1;

FIG. 5 represents an axial section, like FIG. 1, with a connector or adapter inserted in the coupling;

FIG. 6 represents a Section on the line VI–VI of FIG. 5.

Referring to the drawing, a catheter 1, of rubber, latex or other suitable material having a tip (not shown) of any desired type, is provided with a flaring funnel 2 for attachment by means of the connector or adapter 3 to a drainage and/or irrigation tube (not shown).

Within the funnel there is secured, as by cementing, a subassembly, comprising a piece of rubber tubing 4 somewhat shorter than the funnel and a stiff plastic valve liner 5 of generally conical form, split from its apex 6 almost to its base 7, and attached, as by the stud 8, to a flattened outer end 4' of tubing 4. The apex 6 of the valve liner extends approximately to the middle of the tubing 4. The valve liner may also have a flange 9 extending radially outward from its base to rest against the end of the funnel and aid in determining the correct positioning of the parts.

It will be understood that the parts may be conveniently assembled by securing the flattened end portion 4' of the tubing 4 to the valve liner 5, as with the aid of the projection or stud 8, and then inserting this subassembly in the funnel 2. The inner end of the tubing 4 is of a size to engage tightly against the wall of the funnel throughout a zone 10, extending axially about one-third the length of the tubing, for closing the lumen of the funnel tightly and automatically when there is no connector or adapter engaged in the valve liner. For additional security, as well as to prevent accumulation of drainage in the tubing, the inner end of the tubing section may be closed by a thin membrane 4" in which case the flattened end 4' should remain unsealed to permit compression and expansion of the tubing.

In use, the catheter (assumed to have been introduced in a patient) is connected to a drainage or irrigation system by inserting the connector or adapter 3 into the valve liner 5, as shown in FIG. 5, to a distance which brings the inner end of the connector approximately even with the inner end of the tubing 4. The connector spreads apart the split halves of the valve liner, engaging tightly against the inner surface thereof, and also engages for a short distance the wall of the funnel 2 and one side of the tubing 4 which is collapsed to leave a free straight passage through the connector and into the catheter lumen. Upon removal of the connector, the valve liner sections close together and the collapsed tubing expands to obturate completely the funnel lumen, as shown in FIG. 1. The engagement between the surfaces of the hard plastic connector or adapter and the stiff plastic valve liner is firm but readily releasable, and the catheter is automatically and completely closed whenever it is disengaged from the connector or adapter.

The relatively stiff valve liner or slip 5 may be of polyethylene, polypropylene or other suitable material, designed to utilize its physical shape as well as the natural lubricity of the material to provide an effortless means for connecting the drainage tube and catheter while simultaneously opening the catheter lumen.

We claim:

1. A catheter-coupling assembly in combination with the funnel of a catheter comprising: a section of rubberlike tubing having a diameter equal to that of the funnel lumen, a length less than the length of the funnel, and being installed midway therein and a valve liner element having an open end adjacent the open end of the funnel and separable parts extending into the funnel, one of said parts resting against one side of the tubing section, the end of the tubing adjacent said valve-liner element being flattened between said element and the wall of the funnel.

2. A catheter-coupling assembly according to claim 1 in which the valve liner has a relatively hard inner surface.

3. A catheter-coupling assembly according to claim 1 in which the valve liner is of a relatively still bendable plastic material.

4. A catheter-coupling assembly according to claim 1 in which the valve liner is substantially conical and is split axially from its apex to points adjacent it base to form said separable parts.

5. A catheter-coupling assembly according to claim 1 in which the end of the tubing opposite the flattened end is closed.